US008660122B2

(12) United States Patent
Klein et al.

(10) Patent No.: US 8,660,122 B2
(45) Date of Patent: Feb. 25, 2014

(54) DATA TRANSMISSION OVER LOW POWERED NODES

(75) Inventors: Philippe Klein, Jerusalem (IL); Eyal Abrahamov, Rishon Le Zion (IL)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/438,579

(22) Filed: Apr. 3, 2012

(65) Prior Publication Data

US 2013/0259034 A1    Oct. 3, 2013

(51) Int. Cl.
*H04L 12/28*    (2006.01)
(52) U.S. Cl.
USPC ........... 370/389; 370/236; 370/311; 370/385; 370/410; 370/426
(58) Field of Classification Search
USPC ......... 370/311, 496, 522, 527, 528, 529, 236, 370/385, 410, 426
See application file for complete search history.

(56) References Cited

U.S. PATENT DOCUMENTS

| 6,662,224 B1 * | 12/2003 | Angwin et al. ............... 709/224 |
| 2002/0169008 A1 * | 11/2002 | Hiben et al. .................. 455/574 |
| 2006/0215698 A1 * | 9/2006 | Hamdan ....................... 370/471 |
| 2010/0061403 A1 | 3/2010 | Mueller |
| 2010/0309832 A1 * | 12/2010 | Laudel .......................... 370/311 |

OTHER PUBLICATIONS

Society of Cable Telecommunications Engineers, SCTE Implication Paper, Deploying Enhanced Media Services with MoCA—The Challenges and rewards of MoCA Deployment for the Home Network, downloaded Feb. 24, 2012.
Multimedia Over Coax Alliance, MoCA MAC/PHY Specification v1.0, Feb. 8, 2011.
Multimedia Over Coax Alliance, MoCA MAC/PHY Specification v2.0, Jun. 8, 2010.

* cited by examiner

*Primary Examiner* — Hassan Kizou
*Assistant Examiner* — Abdullahi Ahmed
(74) *Attorney, Agent, or Firm* — Brinks Gilson & Lione (57) ABSTRACT

A communication technique facilitates transmission of low rate traffic over communication nodes. The nodes may be, for example, MoCA nodes. The communication happens while keeping the nodes in ultra low power mode. Accordingly, the technique increases the communication capabilities and coverage of networked nodes without impacting the overall power consumption budget. In one implementation, the technique includes encapsulating a datagram into a datagram information element, appending the datagram information element to a discovery request message, and sending the discovery request message to a network controller. The network controller extracts the datagram information element and forwards it (e.g., by broadcasting) to ultra low powered nodes, for example in an admission control frame.

20 Claims, 7 Drawing Sheets

DATA TRANSMISSION OVER LOW POWERED NODES

TECHNICAL FIELD

This innovation relates to data communication. In particular, this innovation relates to data communication for communication nodes in low power states.

BACKGROUND

Continual development and rapid improvement in communication technologies have lead to Bluetooth, Zigbee, WiFi, MoCA, and other communication protocols. These protocols facilitate the creation of networks of nodes, with varying degrees of range, capabilities, and number of supported nodes. For example, Bluetooth networks excel at connecting multiple closely located nodes. As is often the case, the nodes in the network may be mobile and may have limited power supplies (e.g., limited battery reserves). Such nodes implement low power modes in order to operate as power efficiently as possible. However, the nodes in lower power modes often desire to send data over the network, or to other networks. Doing so can mean that the node leaves its power saving mode and spends additional valuable power to make its communication.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The discussion below makes reference to network nodes. The network nodes may connect using a wireless or wired physical interface, such as coaxial cable, or a combination of such interfaces. In that regard, the network nodes may communicate according to the Multimedia over Coax (MoCA) standard, e.g., MoCA 2.0. However, the principles discussed below are applicable to network nodes communicating according to other versions of MoCA or according to other standards that support similar functionality.

The network nodes may be implemented in many different ways and may take many different forms. As examples, the network nodes may be smart phones, tablet computers, headsets, microphones, cameras, or laptop computers. As additional examples, the network nodes may be set top boxes, CD, DVD or Blu-Ray™ players, satellite television receivers, or cable modem interfaces. Additional examples of network nodes include televisions, stereo equipment such as amplifiers, pre-amplifiers, and tuners, home media devices such as compact disc (CD)/digital versatile disc (DVD) players, portable MP3 players, high definition (e.g., Blu-Ray™ or DVD audio) media players, or home media servers. Other examples of network nodes include musical instruments, microphones, climate control systems, intrusion alarms, audio/video surveillance or security equipment, video games, network attached storage, network routers and gateways, pet tracking collars, or other devices. Network nodes may be found in virtually any context, including the home, business, public spaces, or automobile. Thus, as additional examples, network nodes may further include automobile audio head ends or DVD players, satellite music transceivers, noise cancellation systems, voice recognition systems, climate control systems, navigation systems, alarm systems, engine computer systems, or other devices.

Figure 1:
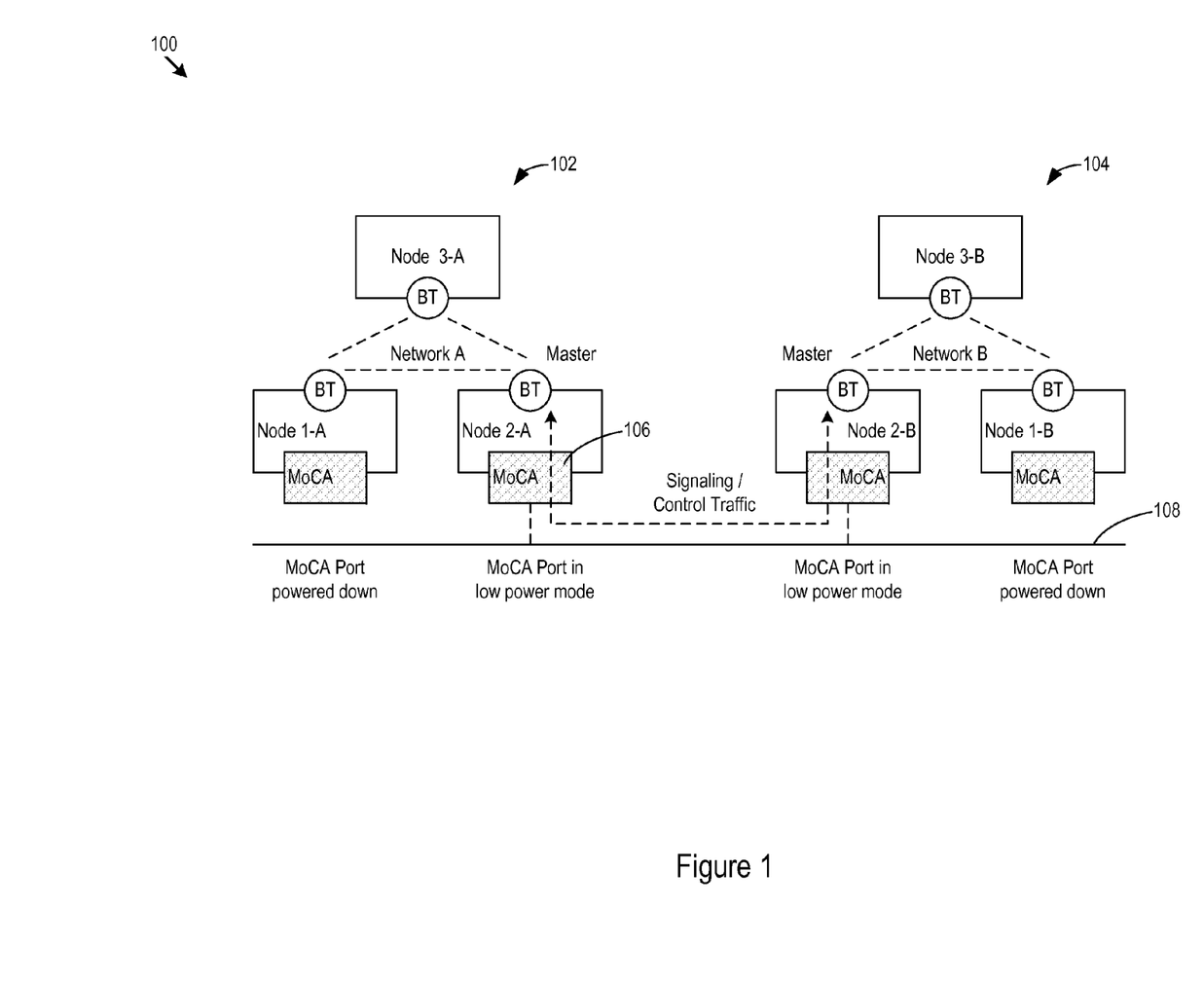
FIG. 1 is an example of two networks in which two nodes in low power modes communicate between the networks.

FIG. 1 is an example 100 of two networks 102 and 104 in which nodes 2-A and 2-B communicate data between the networks 102 and 104. The nodes 2-A and 2-B communicate between the networks 102 and 104 by sending, e.g., datagrams, Ethernet frames, or other data while the network nodes are not in low power modes. However, using the techniques described below, the nodes 2-A and 2-B may also communicate while in low power modes.

The network 102, for the purposes of illustration, includes the nodes 1-A, 2-A, and 3-A. The nodes 1-A, 2-A, and 3-A may communicate as devices that form a local network. The nodes 1-A, 2-A, and 3-A may, for example, communicate with one another using the Bluetooth (BT) protocol, or other communication protocols such as Zigbee, WiMax, or WiFi. Similarly, for the purposes of illustration, the network 104 includes the nodes 1-B, 2-B, and 3-B. The nodes 1-B, 2-B, and 3-B may also communicate as devices that form a local network using Bluetooth, Zigbee, WiMax, WiFi, or another communication protocol. The networks 102 and 104 may include any number of nodes and may add or remove nodes dynamically.

FIG. 1 also shows that certain nodes have an additional communication interface (e.g., in addition to the BT interface). In this example, the nodes 1-A, 2-A, 1-B, and 2-B include Multimedia over Coax Alliance (MoCA) interfaces, such as the MoCA interface 106. The MoCA interfaces connect the network nodes 1-A, 2-A, 1-B, and 2-B together over a coaxial cable physical interface 108. Other physical interfaces may connect the nodes, either wired or wireless, using MoCA or a different communication standard.

Under certain communication standards, including MoCA, nodes may transition between various operating modes, including low power modes. Under some standards or in some implementations, power modes may generally refer to operational characteristics or behaviors that result in differences in power consumption when those characteristics or behaviors are carried out by the network node. In some implementations, power modes may be considered the power configuration (e.g., a MoCA power state) and the operational mode while in that power configuration. As one specific example, MoCA provides for an M0 (active) power state, an M1 (low power idle) power state, an M2 (standby) power state, an M3 (sleep) power state, and an M4 (off) power state. The M0 power state may represent the normal operational state for a network node, in which the network node is typically fully powered and is able to send and receive data, e.g., via broadcasting or unicasting packets. The M1 power state is a low power mode in which the network node exhibits a reduced level of activity that allows the network node to consume less power than in the M0 power state. In the M1 power state, the network node may still receive broadcast or unicast packets, but it does not transmit packets. The M2 power state is a mode of minimal activity that allows the network node to consume even less power than when it is in the M1 power state. In M2 power state the network node may only receive limited information, such as beacons and Ethernet broadcast frames relayed by a network controller in special admission control frame (ACF) slots. In M3 power state, the network node is in an inactive state that allows the network node to consume even less power than when it is in the M2 power state. When in M3 power state, the network node generally does not transmit data or listen even to beacons on a regular basis.

Although in a low power power state (e.g., M1, M2, or M3), a network node may need or desire to communicate with other network nodes in the same or different networks. Doing so ordinarily would mean exiting the ultra low power mode and transitioning to a full power power state (e.g., M0). Then, when in the full power mode, the network node would send its data, thereby consuming additional power to send the communication and incurring additional overhead to return to the full power mode. However, using the techniques described below, the network node may communicate its data without leaving the low power mode that the network node is in.

Figure 2:
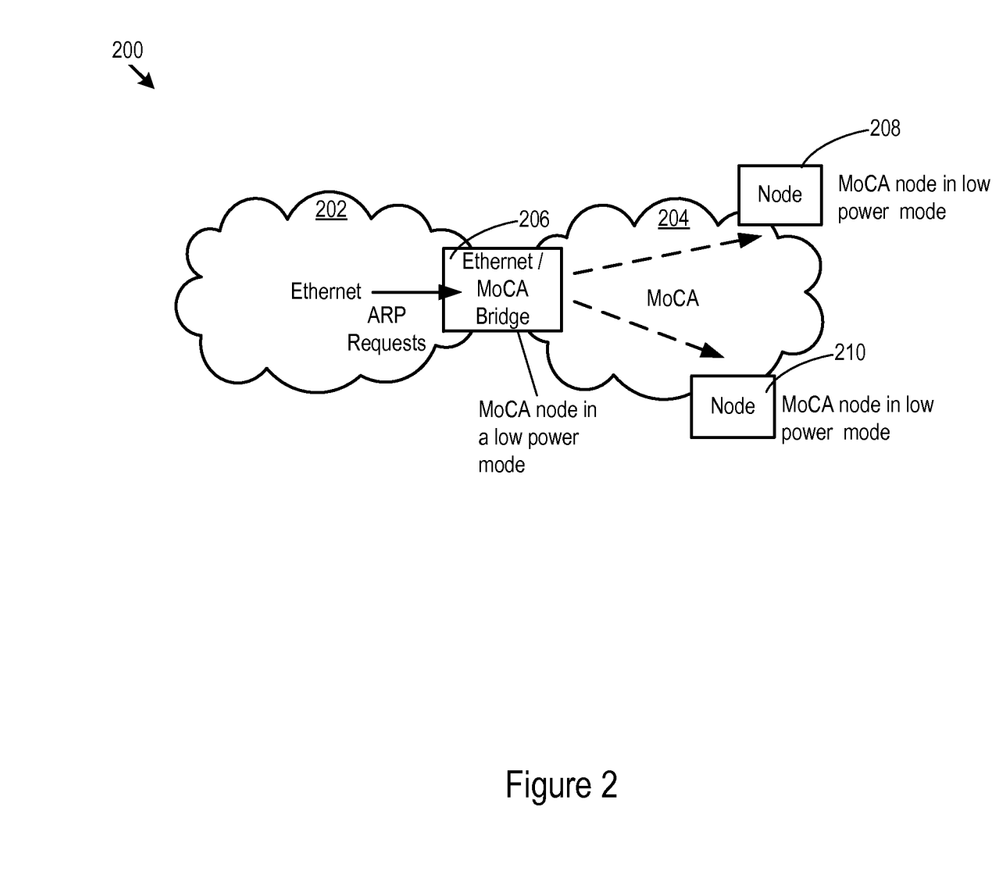
FIG. 2 shows an example of address resolution protocol (ARP) traffic using low power nodes.

FIG. 2 shows a networking example 200 of address resolution protocol (ARP) traffic using low power network nodes. For the purposes of illustration, in FIG. 2 an Ethernet network 202 communicates with a MoCA network 204 through a bridge 206. Other types of networks may be in communication with each other.

In the example shown in FIG. 2, the bridge 206 directs ARP traffic to MoCA nodes 208 and 210. Using the techniques described below, the MoCA nodes 208 and 210 may be in low power modes, yet still receive and respond to the ARP traffic without switching back to an active state. Thus, using the techniques noted below, the bridge 206 receives ARP requests from the network 202 and broadcasts them to the MoCA nodes 208 and 210 that remain in low power modes.

As illustrated in FIGS. 1 and 2, network nodes exchange general purpose data, despite being in low power modes. The data may be signaling, control, audio, video, or other information. Examples of how the exchange may be accomplished are described below.

Figure 3:
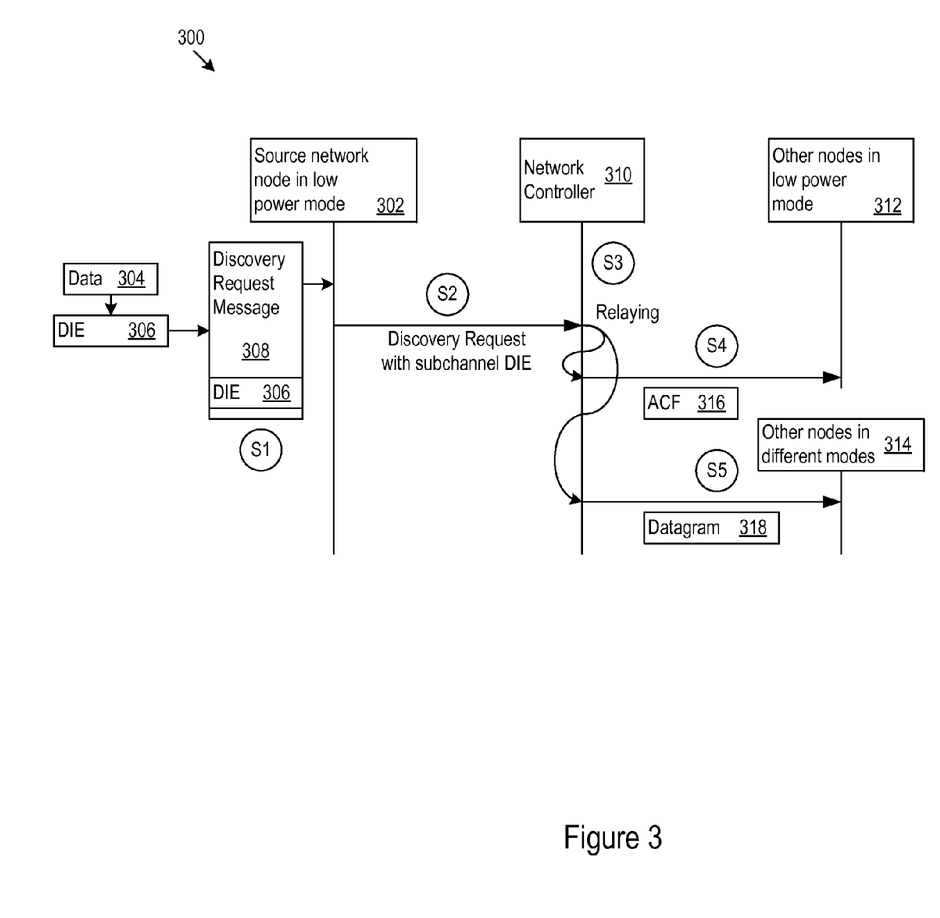
FIG. 3 shows an example of how a network node that operates in a power saving mode may transmit frames without transitioning to an active state than consumes more power.

FIG. 3 shows an example of a data flow diagram 300. The diagram 300 shows a particular example in which a source network node currently in a low power mode transmits data to other network nodes that may or may not also be in low power nodes. The source network node transmits the data without transitioning to an active state that consumes more power than the operating mode in which the network node is presently operating. In other words, the source network node transmits the data while remaining in the low power mode.

In particular, FIG. 3 shows that a source network node 302 is currently in a low power mode. The lower power mode may be, as examples, the M1, M2 or M3 power states defined under the MoCA 2.0 specification, or other modes under other standards. The low power mode of operation may be one that consumes less power than a different mode of operation (e.g., the M0 power state) that the network node could transition to in order to send the data. The lower power mode of operation may also be a mode in which the network node does not under normal circumstances receive or transmit general purpose data, though the network node may still receive network management, housekeeping, heartbeat or other kinds of management messages.

The source network node 302 may decide to communicate any type of data for any reason. As examples, the network node 302 may communicate for signaling, link-maintenance, address resolution protocol (ARP) requests, audio/video data streaming, general purpose data communication or other reasons. As another example, the network node 302 may communicate using this technique in order to respond to a communication received from another network node. FIG. 3 shows how the source network node 302 in power saving power state (e.g., M2 or M3) is able to transmit general purpose data without transitioning to an active power state (e.g., M0). Not transitioning to the active state (e.g., remaining in the low power state) has the benefit of not forcing the source network node 302 to go through readmission to the network before transferring the data, thereby saving time and power.

At S1, the source network node 302 encapsulates data 304 into a new datagram information element (DIE) 306. The data 304 may be part of a data stream communicated by the source network node 302 over multiple separate messages. In one implementation, the DIE 306 may have a type field, length field, and value field. The type field may specify, for example, "Datagram". The value field may store the data and may define an Ethernet frame or other network protocol transfer unit, with a length specified in the length field. The source network node 302 appends the DIE 306 to a message permitted to be sent in the low power mode, such as a network management message. As one particular example, the network management message may be a discovery request message 308 under the MoCA standard.

More specifically, the discovery request message may be a pre-admission discovery request message under the MoCA standard. The source network node 302 may send the pre-admission discovery request message to the network controller 310 while remaining in the low power mode. In the pre-admission discovery request message, the QUERY_PAYLOAD holds network information elements. A new network information element corresponding to a datagram for general purpose data transfer may be defined as the DIE 306 which is added to the pre-admission discovery request message. Network nodes that do not recognize the new information element may ignore the DIE 306 upon reception, but those network nodes that include logic that support the new information element may receive the general purpose data.

At S2, the source network node 302 sends the discovery request message 308 to the network controller 310 while remaining in the low power mode. The network controller 310 exercises management functionality over the set of network nodes, performing such actions as admitting or removing network nodes from the network, maintaining a table of network node power modes, communicating status and control information to the network nodes, and other functionality. The network controller 310 extracts the data in the information element appended to the discovery request message 308 (e.g., from the Ethernet frame that the DIE 306 defines). In one aspect, the DIE 306 forms a subchannel of general purpose data within the network management messages. Viewed another way, the network management messages are not general purpose data communication messages (because they are meant for specific network management functions), but the DIE 306 creates within the network management messages a subchannel of general purpose data. At S3, the network controller 310 relays the data to other network nodes. The other network nodes may include low power network nodes 312 (e.g., network nodes in power state M2 or M3 that generally cannot receive general purpose data streams, but may receive network management messages) and network nodes in other power nodes 314 (e.g., network nodes in power state M1 or M0).

At S4, to relay the data to the network nodes 312 in low power modes, the network controller 310 may encapsulate the data into an Admission Control Frame (ACF) 316, and broadcast the ACF 316 to the low power nodes 312. ACFs may be received by network nodes as management messages while in a lower power state. As a result, the network nodes 312 in low power states may remain in their low power states while receiving the data. For network nodes 314 in other power states, the network controller 310 transmits, at S5, the data in whatever manner is permissible for the network nodes 314. For example, the controller 310 may transmit the data in a MoCA datagram to the network nodes 314.

The network nodes may be implemented in many different ways. A network node may include a network interface (e.g., a MoCA coax interface), and logic in communication with the network interface. The logic is configured to enter a lower power mode of operation, and nevertheless determine to send data. While in the low power mode, the logic adds the data to a message element that defines a general purpose data transmission, adds the message element to a management message permitted to be send by the network node while in the low power mod, and communicates the management message through the network interface (e.g., to the network controller 310). As noted above, the message element may be a datagram or an Ethernet frame, as examples, and the management message may be a MoCA pre-admission discovery request message. The message element may include a type field that defines the message element as a general purpose data transmission. The message element implements a type of subchannel structure that supports general purpose data transmission. The general purpose data transmission may occur over multiple individual data transmissions. In other words, the data may be segmented across individual frames that are transmitted within the management messages, and multiple management messages may be sent to convey any desired amount of data.

Figure 4:
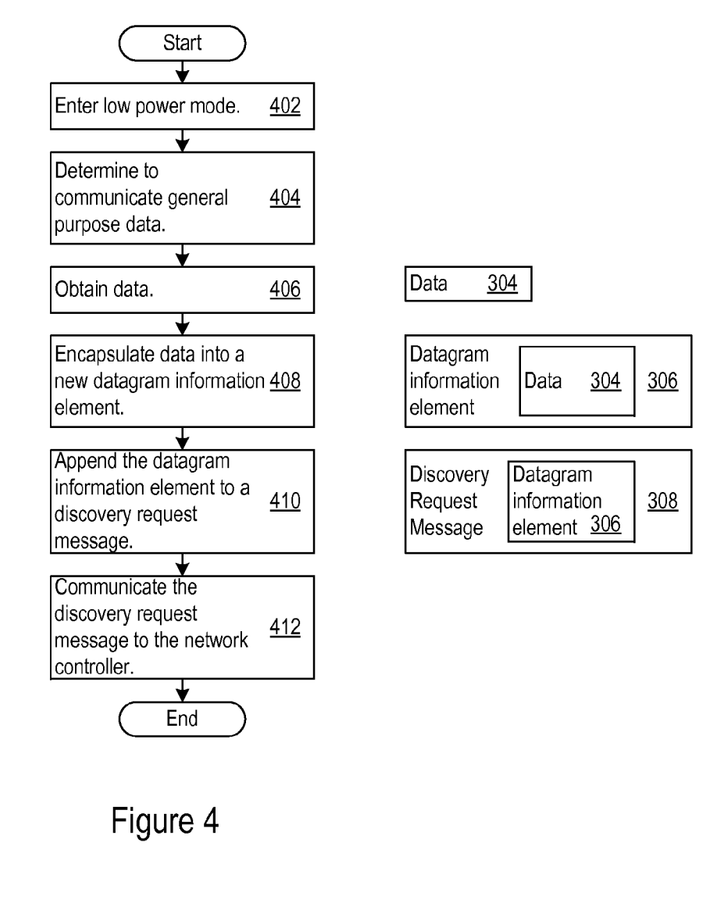
FIG. 4 shows an example of logic that network nodes may implement to transmit data while in low power modes.

FIG. 4 shows an example of logic 400 that network nodes may implement to transmit data while in low power modes. The logic 400 transitions the network node, when desired, to a low power mode (402). The logic 400 also determines to communicate data (404). As examples, the logic 400 may decide to send signaling, link-maintenance, or ARP data or requests. As another example, the logic 400 may decide to send any general purpose data for other reasons, such as audio, video, messaging, hypertext markup language (HTML), file transfer protocol (FTP), or other data. The logic 400, while the network node is in the low power mode, transmits the data without transitioning to an active or higher power mode. To that end, the logic 400 obtains the data (406) and adds the data into a new datagram information element (DIE) (408) or other message element defined to carry data. The logic 400 appends the DIE to a discovery request message (410), a network management message, or some other type of message permitted to be sent while the network node is in the low power mode. The logic 400 sends the discovery request message, for example, to the network controller (412).

Figure 5:
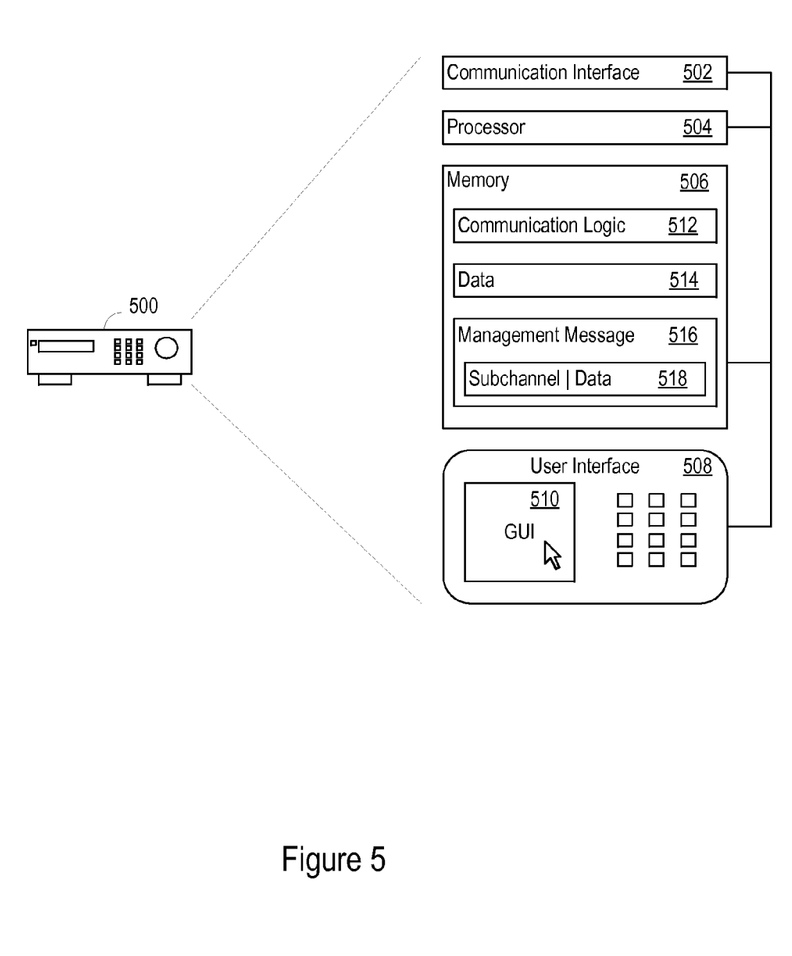
FIG. 5 shows an example of a network node that includes logic for transmitting data when in low power mode.

FIG. 5 shows an example of a network node 500 (in this case a set top box) that includes logic for transmitting data when in a low power mode. The network node 500 includes a communication interface 502 (e.g., a coaxial cable interface), a processor 504, a memory 506, and a user interface 508 that may display, for example, a graphical user interface 510 and that may include input buttons, remote control receivers, and other interfaces.

The memory stores communication logic 512 (e.g., program instructions) that may implement the processing described above with regard to FIG. 4. The communication logic 512 obtains the data 514 from the memory 506 and creates the message elements 518 that hold the data (e.g., the information elements). The communication logic 512 adds the message elements to a management message 516 permitted to be sent in the low power mode, and sends the management message 516 through the communication interface 502 to, for example, a network controller.

Figure 6:
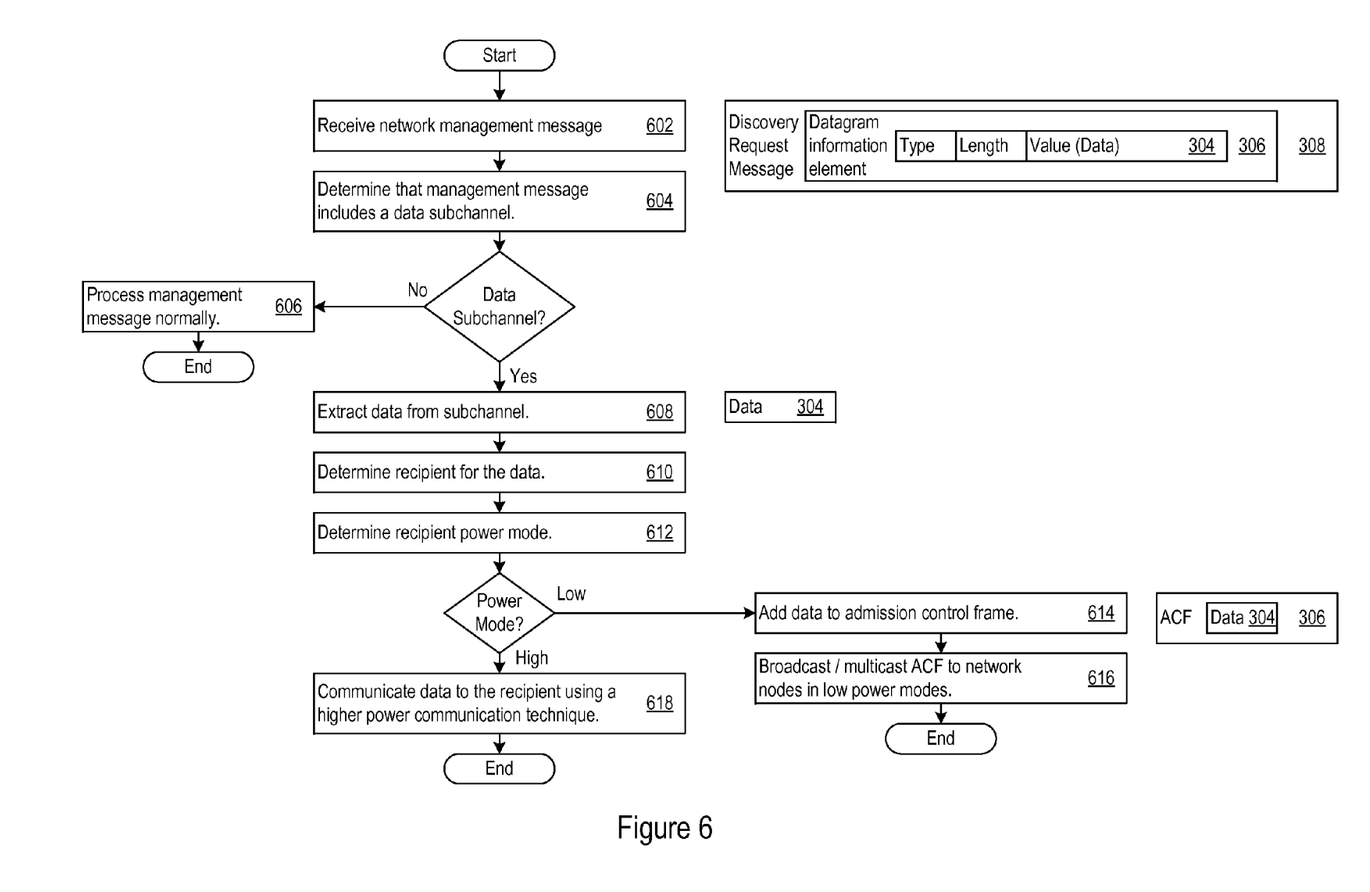
FIG. 6 shows an example of logic that a network controller may implement to transmit data to other network nodes that may be in low power modes.

FIG. 6 shows an example of logic 600 that a network controller may implement to transmit data to other network nodes that may be in low power modes. The logic 600 receives an incoming message that a network node is permitted to send in lower power mode (e.g., a network management message such as a pre-admission discovery request message) (602). The logic 600 determines that the management message includes a data subchannel (604). The logic may do so, for example, by looking for an information element in the received message with a type that indicates a data subchannel (e.g., type=Datagram). If the logic 600 does not recognize a data subchannel, then the logic 600 may process the received message in the normal manner for such messages (606).

Otherwise, the logic 600 extracts the data from the received message (608), determines a recipient for the data (610), and determines the recipient power mode (612). The logic 600 may determine the recipient by, for example, checking a destination address (e.g., a unicast, multicast, or broadcast address) in the data (e.g., in an Ethernet frame or other protocol frame defined by the data). The logic 600 may determine the recipient power mode 612 by consulting a status table in memory. The logic 600 may update the status table periodically by receiving status updates from network nodes.

For the recipient nodes that are in a low power mode, the logic 600 adds the data to an outgoing message that the recipient nodes may still receive in the low power mode (614). For example, the logic 600 may add the data to an admission control frame (ACF) defined under the MoCA 2.0 standard. The logic 600 may then unicast, broadcast, or multicast the outgoing message to the network nodes that are in the low power mode (616). Upon reception of the ACF frame, the network node processes the ACF frame, including extracting the data added to the ACF frame. The network may then take any appropriate action on the extracted data. As examples, the network node may deliver the audio or video data to an audio or video application running on the network node, may respond to a message in the extracted data, or take any other action on the extracted data. Otherwise, for network nodes that are in active modes, the logic 600 communicates the data to those network nodes using an active communication technique (618). The active communication technique may be, for example, sending an Ethernet frame or datagram that is not encapsulated in an outgoing message that a network node can receive while in a low power mode (such as the ACF message). In other words, the active communication technique may be a technique that only nodes in active power modes can receive.

Figure 7:
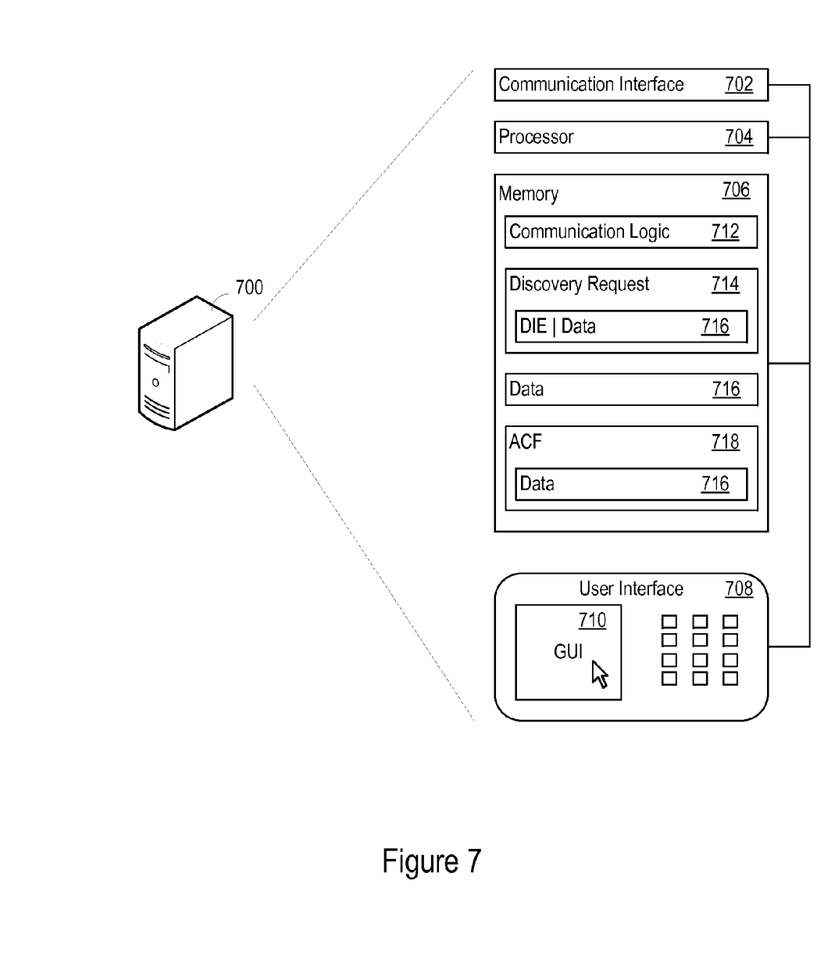
FIG. 7 shows an example of a network controller that includes communication logic that facilitates communication of data between nodes in low power modes.

FIG. 7 shows an example of a network controller 700 that includes communication logic that facilitates communication of data between nodes in low power modes. The network controller 700 includes a communication interface 702 (e.g., a coaxial cable interface), a processor 704, memory 706, and a user interface 708 that may display, for example, a graphical user interface 710 and that may include input buttons, remote control receivers, and other interfaces.

The memory stores communication logic 712 (e.g., program instructions) that may implement the processing described above with regard to FIG. 6. In one implementation, the communication logic 712 obtains the data 716 from a received pre-admission discover request message 714 and determines the data recipient and recipient power mode. For recipients in low power modes, the communication logic 712 may add the data to an admission control frame 718 or another outgoing message that the network nodes in low power modes are able to receive, and sends the outgoing message through the communication interface 702 to the network nodes.

The techniques described above facilitate transmission of low rate traffic over communication nodes (e.g., MoCA nodes) while keeping the nodes in ultra low power mode. Accordingly, the techniques increase the coverage of interconnected nodes without impacting the overall power consumption budget. With regard to MoCA nodes in particular, this connectivity takes advantage of the MoCA backbone without impacting the power saving provided by MoCA power management capabilities. The techniques may apply to any case where a low rate transmission will be sent over a backbone, and a MoCA backbone could be used without departing from the power consumption budget of the application/network.

Transmissions between nodes in low power modes could be used, for example, to interconnect clouds of range limited technology such Bluetooth, Zigbee, Wi-Fi, or other technology clouds. The transmissions have the beneficial effect of increasing the coverage of a very low powered signaling network (e.g., in the home, public spaces, or office). The transmissions further allowing connected devices to be remotely woken up. Another use case is handling ARP traffic over a bridge MoCA network without impeding the MoCA power saving capabilities. In this use case, ARP requests received from an Ethernet network may be broadcast by the bridge to MoCA nodes kept in their ultra low power mode of operation.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An apparatus comprising;
a network interface; and
logic in communication with the network interface, the logic configured to:
  enter a low power mode of operation;
  determine to send data that the low power mode does not ordinarily permit to be sent while in the low power mode; and
  while in the low power mode:
    add the data to a message element that defines a general purpose data transmission;
    add the message element to a management message that the low power mode does permit to be sent while in the low power mode; and
    communicate the management message through the network interface.

2. The apparatus of claim 1, where the message element comprises a datagram.

3. The apparatus of claim 1, where the management message comprises a discovery request message.

4. The apparatus of claim 1, where the message element comprises a type field that defines the message element as the general purpose data transmission.

5. The apparatus of claim 4, where the message element further comprises:
a value field that stores the data; and
a length field that stores a length of the data in the value field.

6. The apparatus of claim 1, where the low power mode comprises a standby mode, a sleep mode, or both.

7. The apparatus of claim 1, where the low power mode comprises a Multimedia over Coax Alliance (MoCA) M2 or M3 power state, or both.

8. A product comprising:
a non-transitory machine readable medium; and
logic stored on the medium that when executed by a processor in a device, causes the processor to:
  obtain data to be sent;
  determine that the device is in a low power mode that does not ordinarily permit the data to be sent ; and
  while in the low power mode:
    add the data to subchannel structure that supports a general purpose data transmission;
    add the subchannel structure to a message that the low power mode does permit to be sent while in the low power mode; and
    communicate the message through a network interface.

9. The product of claim 8, where the subchannel structure comprises a datagram, or Ethernet frame, or both.

10. The product of claim 8, where the message comprises a network maintenance message.

11. The product of claim 8, where the message comprises a Multimedia over Coax (MoCA) discovery request message.

12. The product of claim 8, where the subchannel structure comprises:
    a type field that defines the subchannel structure as the general purpose data transmission;
    a value field that stores the data to be sent; and
    a length field that stores a length of the data in the value field.

13. The product of claim 8, where the low power mode comprises a standby mode, a sleep mode, or both.

14. The product of claim 8, where the subchannel structure supports communication of a data stream formed by multiple of the messages sent with different data.

15. A device comprising:
    a network interface; and
    logic in communication with the network interface, the logic configured to:
        receive an incoming management message from a network device;
        determine that the management message includes a data subchannel;
        extract data from the data subchannel;
        determine a recipient for the data;
        determine a recipient power mode of the recipient; and
        when the recipient power mode comprises a low power mode:
            add the data that the low power mode does not ordinarily permit to be sent while in the low power mode to a message element;
            add the message element to an outgoing management message permitted to be sent in the low power mode; and
            communicate the outgoing management message to the recipient through the network interface.

16. The device of claim 15, where the logic is further configured to:
    when the recipient power mode comprises other than the low power mode:
    communicate the data to the recipient without adding the data to the message element in the outgoing management message.

17. The device of claim 15, where the network interface is part of a network controller that manages the network device and the recipient.

18. The device of claim 15, where the message element defines a structure for a general purpose data transmission.

19. The device of claim 15, where the outgoing management message comprises a Multimedia over Coax (MoCA) admission control frame (ACF).

20. The device of claim 15, where the incoming management message comprises a Multimedia over Coax (MoCA) discovery request message.

* * * * *